R. DÉDET.
SELF ACTING GAUGE.
APPLICATION FILED MAY 8, 1918.
1,407,388.
Patented Feb. 21, 1922.
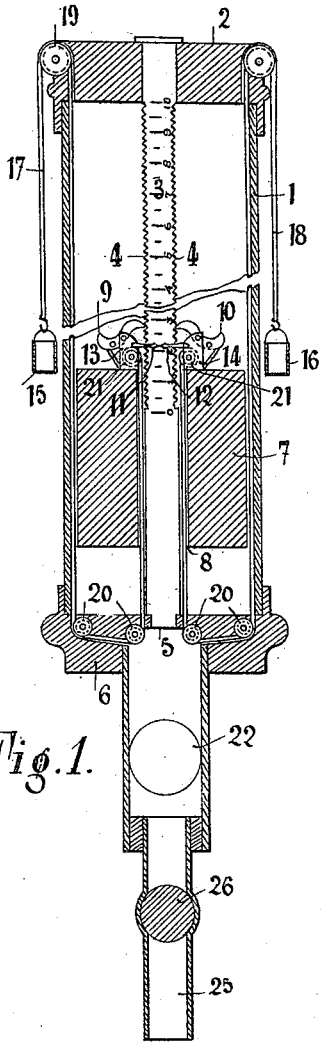
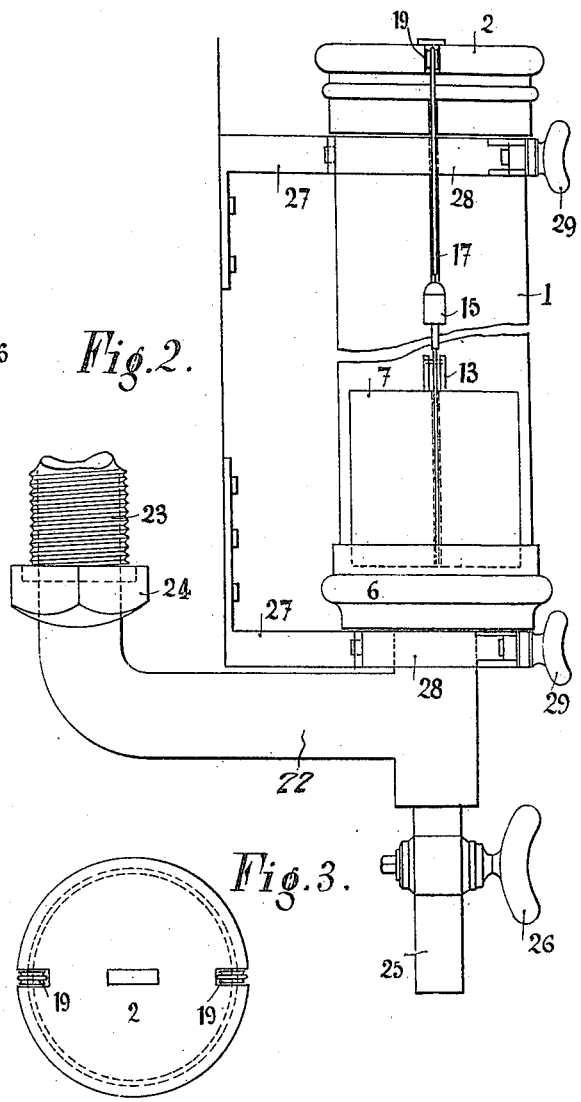
Fig.1.
Fig.2.
Fig.3.
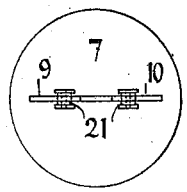
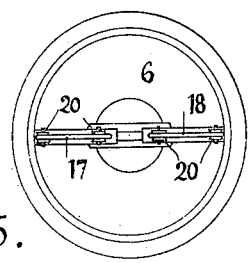
Fig.4.
Fig.5.
Inventor:-
René Dédet
By:- B. Singer, atty.

UNITED STATES PATENT OFFICE.

RENÉ DÉDET, OF LAMENTIN, GUADELOUPE, FRANCE.

SELF-ACTING GAUGE.

1,407,388.

Specification of Letters Patent. Patented Feb. 21, 1922.

Application filed May 8, 1918. Serial No. 233,363.

(GRANTED UNDER THE PROVISIONS OF THE ACT OF MARCH 3, 1921, 41 STAT. L., 1313.)

*To all whom it may concern:*

Be it known that I, RENÉ DÉDET, a citizen of the Republic of France, residing at Lamentin, Guadeloupe, France, having invented new and useful Improvements in Self-Acting Gauges, (for which I have filed an application in France October 12th 1916, Patent Number 483,581,) of which the following is a specification.

My invention relates to a self-acting gauge for registering any amount of liquid entered in any kind of vessel, same being based on the principle of communicating vessels and comprising chiefly a float which is equipoised and influenced by the push of the liquid contained in the vessel to be gauged.

On the annexed drawing to which it is referred:

Fig. 1 is a vertical section of the gauge together with its various members.

Fig. 2 illustrates in a whole the gauge on its outside view and

Fig. 3 is a detail plan of the upper disk.

Fig. 4 is a similar view of the float.

Fig. 5 is a similar view of the lower disk and its connections.

In referring to the drawing this gauge comprises a glass tube 1 each end of which is provided with an upper disk. The upper disk 2 bears a graduated rule 3 having side teeth as indicated in 4, the lower end of same engaging with a convenient notch 5 provided in the central part of the lower disk 6.

The rule 3 is axially fixed in the glass tube 1 and bears convenient graduations for gauging; said rule serves also as a guide for a float 7 which is made of tin-lined copper and provided with a central slot 8 through which the rule 3 extends.

Pawls 9 and 10 are pivotally mounted on this float, and arranged to engage at the proper time with the side teeth of the rule for holding the float motionless and permitting the reading of the graduations indicated by the indexes 11 and 12 fixed on bearings 13 and 14 of said pawls 9 and 10.

The float 7 being free in the vessel is equipoised by means of two cylinders 15 and 16 which may be supplied with any suitable weighing material, the loading of which is determined as required, the same being hung on the end of two yielding and thin cables 17 and 18 made of tin-lined copper, and passing over guiding rollers 19 and returning rollers 20. Said cables pass through the float by means of the slot enclosing the rule in order to be connected with the pawls 9 and 10 by passing over rollers 21. At the lower part of the gauge on the disk 6 is placed a communicating small tube 22 bent at right angle and bearing a threaded part 23 with a fixing nut 24. This tube 22 establishes communication between the gauge and the vessel. The gauge may be emptied through the nozzle 25 provided with a gauge cock 26.

Tube 22 being fixed on the bottom of the vessel to be gauged, bearings provided with collars 28 and fixing screws 29 insure the definitive fixation of the whole device.

When setting up this gauge, the lower disk will be flush with the vessel bottom in order than the smallest amount of liquid entering in the vessel may contact with the base of the float 7, the indexes 11 and 12 of which will be maintained at zero on the scale and the pawls 9 and 10 at their first notch.

The top disk 2 will project beyond the vessel sufficient to permit the float to continue to ascend to the highest grade of the scale, which will correspond to the whole capacity of the vessel.

For graduating the rule, the vessel being full of liquid and the float at its stop-notch at the top of its stroke, it will be sufficient to place a little board adjacent the vessel opposite the gauge, then to empty into a graduated pot. After the first amount obtained and corresponding to the proportion at which it is desired to graduate (ten liters for instance), the flowing out is stopped and a line is drawn on the little board opposite the float indexes.

This way of proceeding is repeated for each decaliter, or ten liters, which are emptied until the flowing out is completed. Then the rule is taken out and placed on the so graduated little board, the divisions are marked thereon with a pointer. The number 10 will be the first division appearing at the end of the rule.

The operation is the following:—The float being at its first notch, at the end of its stroke the vessel is filled with liquid, it results that the float ascends by steps until the flow into the vessel is stopped; said float is maintained at one of the notches provided on the rule and it is possible to read the figure on which are placed the indexes, and same will correspond to the amount of liquid contained in the vessel. This vessel is emptied and the float remains at the same height, being so maintained by the pawls. For bringing said float to the end of its stroke, it will be sufficient to raise up the pawls 9 and 10 by drawing on the cables and the float will go down by its own weight.

What I claim is:—

In a gauge of the class described, a vessel having means to supply liquid thereto from the bottom thereof, and to also draw liquid therefrom, a vertical member extending through said vessel and provided with teeth, a float arranged for vertical movement in said vessel, pawls mounted on said float, counterpoising members, and cords connecting said counterpoising members to said pawls to disengage the latter from the teeth of said vertical member.

In testimony whereof I have hereunto set my hand, in presence of two subscribing witnesses.

RENÉ DÉDET.

Witnesses:
　CHAS. P. PRESSLY,
　PAUL CAILLEUX.